United States Patent [19]

Love

[11] Patent Number: 4,488,941
[45] Date of Patent: Dec. 18, 1984

[54] ELECTROPLATING METHOD FOR PRODUCING POROUS TANTALUM CAPACITOR ELECTRODE

[75] Inventor: Gordon R. Love, Williamstown, Mass.

[73] Assignee: Sprague Electric Company, North Adams, Mass.

[21] Appl. No.: 423,966

[22] Filed: Sep. 27, 1982

[51] Int. Cl.$^3$ .......................... C25D 5/02; C25D 3/66; C25C 3/26
[52] U.S. Cl. .................................. 204/15; 204/38 A; 204/39; 204/64 T
[58] Field of Search ................. 204/15, 38 A, 39, 64 T

[56] References Cited

U.S. PATENT DOCUMENTS

| | | | |
|---|---|---|---|
| 1,933,319 | 10/1933 | Driggs et al. | 204/39 X |
| 2,786,809 | 3/1957 | Raynes | 204/39 |
| 3,239,436 | 3/1966 | Hagiwara et al. | 204/39 X |
| 4,148,131 | 4/1979 | Nishino et al. | 204/38 A X |
| 4,450,049 | 5/1984 | Nakata et al. | 204/39 X |

OTHER PUBLICATIONS

Senderoff et al., Coherent Coatings of Refractory Metals, Reprint from Science, Sep. 23, 1966, vol. 153, No. 3743, pp. 1475-1481, pp. 1-7.
Walker et al., Production of Metal Powders by Electrodeposition, Chemistry and Industry (London), Oct. 6, 1979, pp. 642-647.
Cohen, High Rate Electrodeposition of Niobium from Molten Fluorides Using Periodic Reversal Steps on Grain Size, J. Electrochem. Soc., vol. 128, No. 4, Apr. 1981, pp. 731-740.

*Primary Examiner*—Donald R. Valentine

[57] ABSTRACT

A tantalum wire is coated along part of its length with a high-surface-area electro deposit of tantalum from a molten K-salt. This process is relatively very simple and produces an openly porous tantalum sponge having exceptionally high purity for use as an anode in a tantalum capacitor.

8 Claims, 2 Drawing Figures

ELECTROPLATING METHOD FOR PRODUCING POROUS TANTALUM CAPACITOR ELECTRODE

BACKGROUND OF THE INVENTION

This invention relates to a porous tantalum capacitor electrode and more particularly to such an electrode made by electroplating a high-surface-area tantalum sponge on only a portion of a tantalum lead.

The usual method for making porous tantalum capacitor electrodes includes coating tantalum powder particles with an organic binder, dispensing the coated powder into a mold press cavity, compressing the powder to produce a pellet that is held together by the binder, heating the pellet under vacuum to remove the binder and vacuum sintering the pellet at least one time to give it mechanical strength and to purge it of impurities such as carbon and nitrogen. Even these drastic measures, however, cannot remove any oxygen it may have acquired. A tantalum lead wire may be welded to the pellet and sintered again; or the tantalum lead wire, often referred to as a riser wire, may be partially inserted into the mold cavity so that the powder is compressed about a portion of it. A more detailed description of methods for making porous anodes and making capacitors from them are provided by Rogers in U.S. Pat. No. 3,627,520 issued Dec. 14, 1971, by Bernard in U.S. Pat. No. 4,059,442 issued Nov. 22, 1977, by Shirn et al. in U.S. Pat. No. 4,127,680 issued Nov. 28, 1978 and by Pellerin et al. in U.S. Pat. No. 4,025,827 issued May 24, 1977. These patents are assigned to the same assignee as is the present invention.

The tantalum powder is usually obtained by reacting a mixed alkali-tantalum-halide salt, most commonly $K_2TaF_7$ known as K-salt, with metallic sodium that results in a tantalum precipitate. The mixed halide salts can be washed away leaving only the tantalum powder. Most if not all commercial tantalum refining produces such a mixed alkali-tantalum-halide salt.

These steps taken together constitute an effective but high cost process for making tantalum powder. Since metallic sodium is electrochemically refined and owing to the high surface area of the precipitated tantalum, these processes are especially expensive because they are power intensive and time consuming.

A less power intensive way to obtain metallic tantalum has been known for a score of years, namely its direct electrodeposition from a fused alkali-tantalum-halide salt. Substantial effort and attention has been directed toward the avoidance in this process of forming dendritic deposits and toward obtaining solid coherent deposits. It has been established by numerous independent workers in this field that the universally sought-after coherent deposits can be electroplated from such K-salts at relatively low current levels, i.e. no more than three hundred $mA/cm^2$ current density under the most favorable conditions including periodic reversal of the electroplating current. This process, however, would have to be followed by difficult fracturing and comminuting steps to obtain the necessary powder for making a porous tantalum capacitor electrode. The later steps would essentially remove the cost savings that might otherwise have been provided via the electroplating process.

It is known to electroplate metals using aqueous electrolytes at high cathode current densities, e.g. 8 to 36 amperes/$dm^2$ (80 to 360 $mA/cm^2$) to plate out nodules that could be periodically or continuously removed in the form of metal powder. Such nodules are relatively easy to remove and have shapes approaching spherical particles that is desirable for powder particles. However, tantalum and niobium powders have not been produced in this manner so far as is known probably because aqueous salts of these metals are difficult to acquire. It is also known to electroplate metals using nonaqueous fused-salts as the electrolyte for plating refractory metals such as tantalum. Such a plating method is comparatively difficult and expensive and has been applied only for producing coherent coatings of refractory metals. Such plating requires direct current (DC) densities typically below 250 $mA/cm^2$ but may reach 375 $mA/cm^2$ peak when the current is periodically reversed.

It is an object of this invention to circumvent some of the high-cost elements of the prior art and provide a relatively simple and low cost method for making a porous tantalum capacitor electrode.

SUMMARY OF THE INVENTION

A porous tantalum capacitor electrode has a tantalum lead with an electroplated high-surface-area tantalum sponge covering only a portion of the lead. Thus the other portion of the lead is bare so as to provide means for supporting the sponge during subsequent capacitor processing steps and to eventually serve as the means by which the capacitor anode is electrically contacted.

The method for making such a high-surface-area tantalum capacitor electrode comprises inserting a tantalum lead as the cathode in an electroplating cell containing a solution of a tantalum fluoride in a molten alkali-halide and passing sufficient current to deposit a high-surface-area tantalum sponge onto said tantalum lead.

It is highly desirable for making a tantalum capacitor to use a very high purity tantalum metal. This is not easy to accomplish in practice especially because tantalum particularly at elevated temperatures is an avid getter of oxygen and hydrogen. It will literally take these elements from water molecules. In this plating process the fused salt electrolyte is shrouded by an inert gas to avoid oxygen contamination. Fortuitously the hot salt itself also acts as a vigorous oxygen getter so that remnant oxygen in the inert gas cover is removed before the plating commences. Thus for these reasons and because this plating process is essentially a faradaic one whereby the plating current is conducted almost entirely by the transport of tantalum from the anode to the cathode wire, the purity of the plated tantalum is about as good as can be got, without the usual purging steps.

Thus the single step of electroplating from a K-salt to produce a tantalum sponge anode is very simple, compared with the conventional steps including: reacting sodium with a K-salt to precipitate a high surface area tantalum powder, add contaminating binders and compress the mixture in the form of a pellet which tends to mechanically damage the metal, and then purge the pellet by vacuum sintering, this latter step causing a considerable reduction in the tantalum surface area. Furthermore, it is expected from theoretical considerations that the purity of the electrodeposited tantalum anode of this invention will greatly exceed that realized by the above-noted conventional process that itself introduces contaminants. For example, the high-surface-area precipitated tantalum powder typically contains about 1000 ppm of oxygen and a conventionally made tantalum anode has about 3000 ppm of oxygen, and electroplated sponge anodes of this invention will likely contain less than 1000 ppm of oxygen.

DESCRIPTION OF THE PREFERRED EMBODIMENTS

Figure 1:
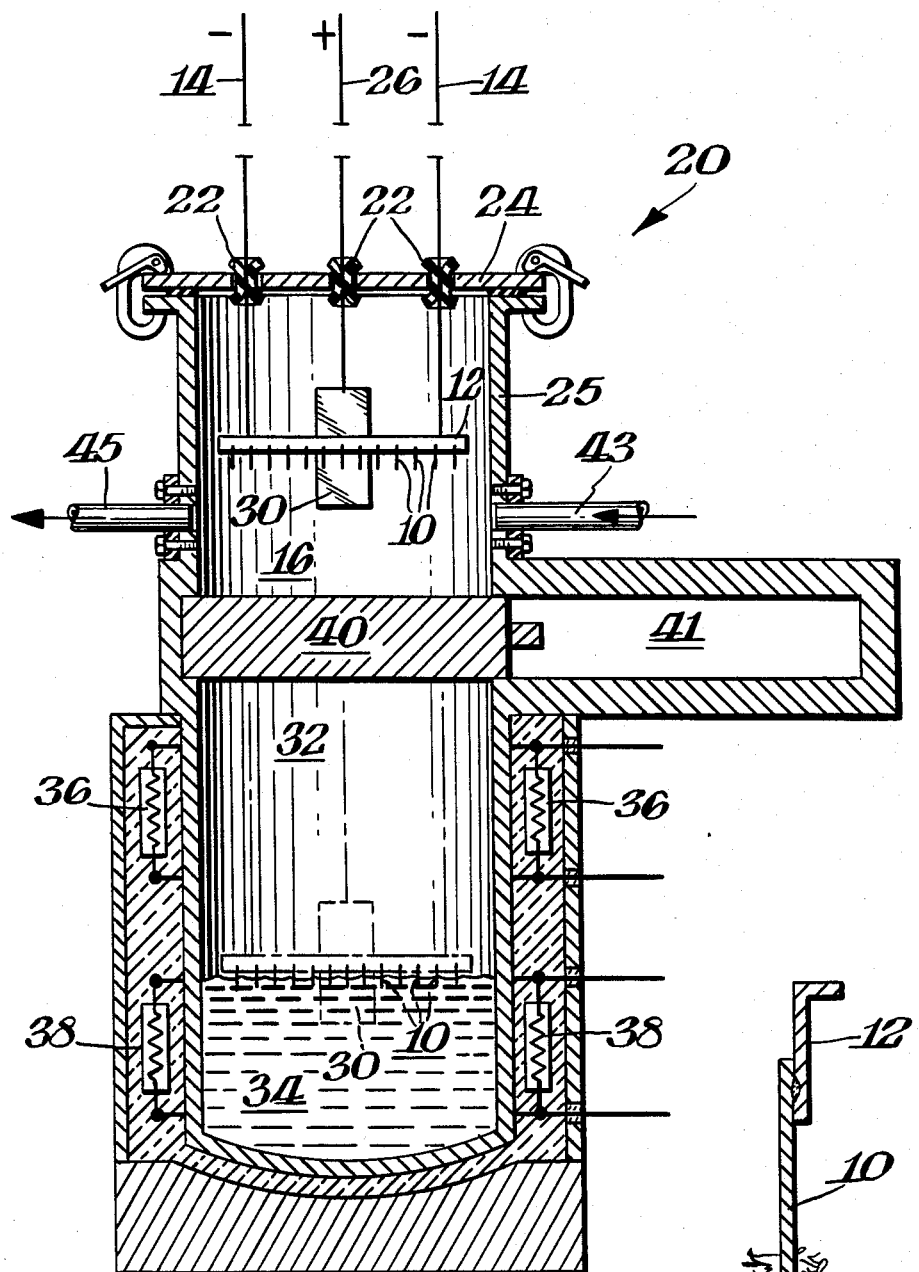
FIG. 1 shows in side sectional view an electroplating cell for making tantalum electrodes of this invention.

A number of tantalum lead wires 10, each of diameter 0.014 inch (0.36 mm) were welded to a stainless steel bar 12 as shown in FIG. 1. The bar 12 was suspended horizontally by a pair of stainless steel rods 14 in an upper chamber portion 16 of a plating apparatus 20. The rods 14 are free to move in the swage-lock fittings 22 mounted in the top cover 24 of tank 25 so that by manipulation of the rods 14 outside and above the apparatus 20, lowering and raising of the bar 12 inside the closed tank 20 may be accomplished. Another stainless steel rod 26 also passes through a swage-lock fitting 22 to support a tantalum plate 30 that will be lowered and raised along with the bar 12 as is to be explained. Meanwhile the swage-lock fittings 22 maintain a fairly effective seal throughout the plating process.

A lower chamber 32 of apparatus 20 is above half filled with an electrolyte 34. The upper portion of chamber 32 may be maintained at one elevated temperature by means of surrounding electrical resistance heaters 36 while the electrolyte 34 may be maintained at the same or another elevated temperature by the surrounding heaters 38. A gate valve 40, when closed, separates the upper chamber 16 and the lower chamber 32. This valve is opened by moving it to the right, as shown, into a pocket 41.

Granules of potassium, sodium and lithium fluorides were introduced in about equal molar amounts into the lower chamber 32 along with about 30 weight percent of potassium tantalum fluoride ($K_2TaF_7$). These components mix and melt together at a temperature less than 800° C.

With the valve 40 open, and with the port 43 closed (by valve means not shown), a vacuum was drawn in the upper chamber 16 by evacuating air from port 45. Argon was then admitted via port 43 to both chambers 16 and 32. Valve 40 is then closed and the heaters 36 and 38 were activated to elevate and stabilize the temperatures in the upper-argon-filled portion of chamber 32 at 795° C. and the electrolyte 34 at 825° C., respectively.

The valve 40 was again opened and the bar 12 and tantalum plate 30 were lowered into the molten electrolyte 34. A current of 2.0 amperes per square inch (0.3 A/cm$^2$) of surface of the tantalum lead wires was maintained for about 30 seconds.

Figure 2:
FIG. 2 shows in side sectional view a porous electrode of this invention for use as a sponge tantalum anode for inclusion in an electrolytic capacitor having a tantalum-oxide-film dielectric.

The bar 12 was removed from the apparatus 20. Each of the lead wires 10 now has a porous sponge 48 of tantalum grown on the lower portion that was immersed as is illustrated in FIG. 2. The sponges 48 and the corresponding tantalum wires 10 were formed, i.e. anodized, to 70 volts in 0.1% $H_2SO_4$ at 80° C. for two hours. The formed sponges 48 were then immersed in an electrolyte of 40% $H_2SO_4$ to just cover the sponges 48. A large tantalum foil was also submersed in the $H_2SO_4$ electrolyte. The electrical capacity of the row of sponges 48 was measured relative to the foil using a small voltage at 1 KHz. This capacity measurement and other capacitor performance measurements are given as Example 1 in the Table.

TABLE

| Ex. | Cap. ($\mu$F) | DF (%) | $I_L$ ($\mu$A @ 50 V) |
|---|---|---|---|
| 1 | 0.028 | 1.5 | 0.2 |
| 2 | 0.175 | 1.5 | 0.2 |
| 3 | 0.042 | 2.3 | 0.05 |
| 4 | 0.010 | 0.8 | 0.002 |

In a second experiment, Example 2, another group of tantalum wires 10 were processed in the same manner as in Example 1 except the electroplating current was raised further to 2.4 amps/in$^2$ (0.37 A/cm$^2$). A third experiment, Example 3, was the same also except that the electroplating current was raised more to 2.7 amps/in$^2$ (0.42 A/cm$^2$). These data are also given in the Table along with a control experiment, Example 4, in which the electroplating was omitted and only the base wires were formed and tested as an electrolytic capacitor.

Relatively high leakage currents ($I_L$) were observed for the capacitors of Examples 1 and 2. This was at least partially due to plating salt residues that would not dissolve in hot water or nitric acid. Units tested in Example 3 were subjected to a 30 second immersion in 25% HF at 25° C. prior to formation. This treatment proved effective in removing the salt.

From the above data it is preferred in the method of this invention that the electroplating current at the tantalum wire be greater than 300 mA for each square centimeter of the wire area that is initially exposed to the molten salt.

A further reduction in costs may be effected by using an inexpensive metal lead such as copper or iron that is coated with tantalum. This can be accomplished by immersing a copper wire into the molten K-salt solution and applying a low value current, e.g. 0.025 A/cm$^2$, to coat the copper with a smooth coherent layer of tantalum before increasing the current (e.g. to 0.5 A/cm$^2$) to obtain a porous dendritic sponge of tantalum.

What is claimed is:

1. An electroplating method for producing a high-surface-area tantalum capacitor electrode comprising inserting a portion of a tantalum lead as the cathode in an electroplating cell containing a solution of a tantalum fluoride in a molten alkali-halide and passing sufficient current to deposit a high-surface-area tantalum sponge onto said tantalum-lead portion.

2. The electroplating method of claim 1 wherein the temperature of said solution is higher than about 700° C.

3. The electroplating method of claim 1 wherein said tantalum fluoride is $K_2TaF_7$.

4. The electroplating method of claim 1 wherein said molten alkali-halide is selected from a fluoride, a chloride and mixtures thereof.

5. The electroplating method of claim 1 additionally comprising supplying an inert-gas environment over said solution.

6. The electroplating method of claim 1 wherein said current is of one polarity only.

7. The electroplating method of claim 6 wherein said electroplating current at wire is greater than 300 milliamperes per square centimeter of the surface portion of said wire that is initially exposed to said solution.

8. The electroplating method of claim 1 additionally comprising forming a thin dielectric tantalum-oxide film over the surfaces of said tantalum sponge, applying an electrolyte over said oxide film and introducing a counterelectrode to said electrolyte to provide a tantalum capacitor.

* * * * *